Figure 1:
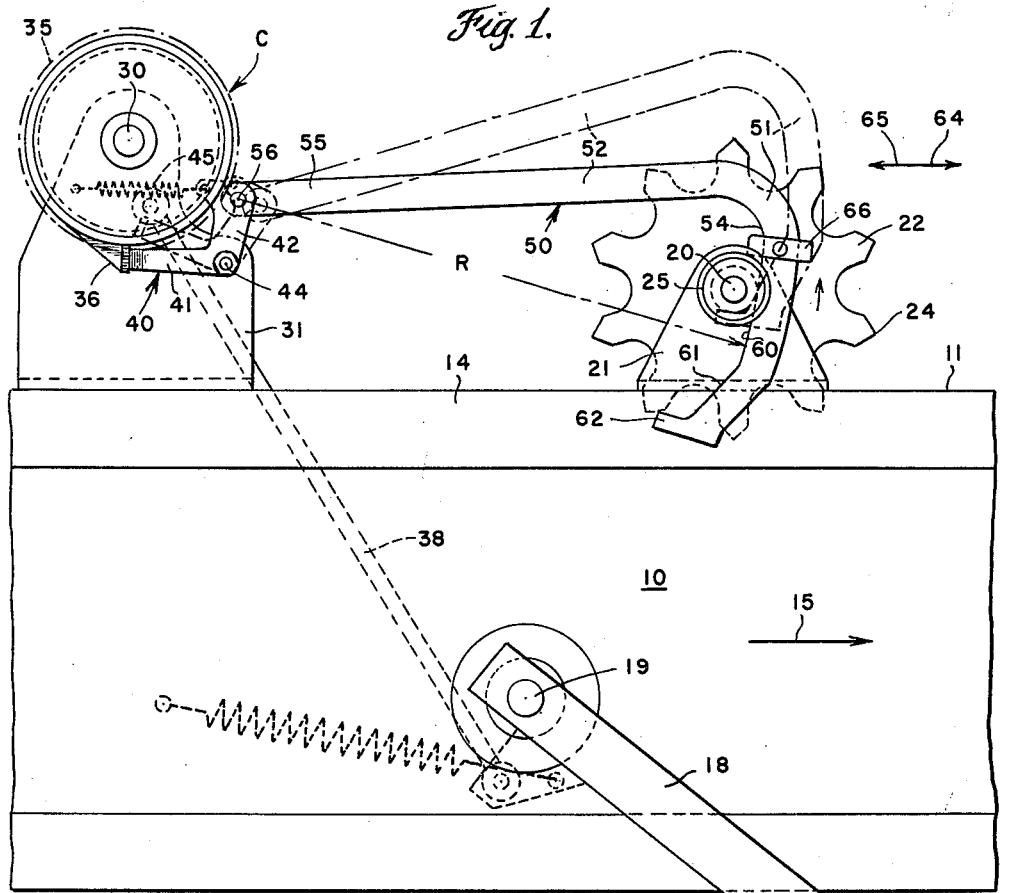

July 20, 1965 J. H. HOLLYDAY 3,195,443
TRIP DEVICE
Filed April 29, 1964

INVENTOR.
JAMES H. HOLLYDAY
BY
ATTORNEY

United States Patent Office 3,195,443
Patented July 20, 1965

3,195,443
TRIP DEVICE
James H. Hollyday, New Holland, Pa., assignor to Sperry Rand Corporation, New Holland, Pa.
Filed Apr. 29, 1964, Ser. No. 363,412
5 Claims. (Cl. 100—4)

This invention relates generally to hay balers and more particularly to means for controlling the operation of a baler clutch. Still more specifically, the invention relates to an improved trip member for a baler.

In a hay baler, bales move progressively through a bale case as they are formed. A metering wheel projects into the bale case to be rotated responsive to bale movement. The rotation of the metering wheel rotates a friction wheel which engages one arm of an L-shaped trip member. The trip member is spring biased against friction wheel and is lifted by its rotation. Conventionally, a U-shaped pocket is provided in the trip member arm and when such pocket comes into register with the friction wheel, the trip member is freed to shift under the spring bias to release a pawl and engage a clutch. The rotation of one element of the clutch is used to reset the trip member to starting position and repeat the measuring cycle. A trip arm of this general type is shown in U.S. Patent No. 3,129,654..

The conventional trip arm operates satisfactorily. However, after extended use, the friction wheel wears the entrance corner of the pocket and the accuracy of the trip is decreased. The wear problem results mainly when the trip member shifts upon reaching the trip arm pocket and the resulting relative movement of the arm and the friction wheel. When the wear on the trip member exceeds a certain amount, depending upon the degree of control the farmer wants, the trip arm has to be replaced.

One object of this invention is to provide an improved trip member which will more precisely and accurately control the operation of a baler than trip constructions presently in use.

Another object of this invention is to provide an improved trip member which is less subject to wear than conventional trip members.

Another object of this invention is to provide an improved trip member of the character described in which the engagement of a friction wheel with an arm of the member is such that wear of the arm as a result of wheel engagement is minimal.

A further object of this invention is to provide a hay baler trip member in which the pocket heretofore employed is eliminated and the trip member is positively moved by wheel engagement rather than by spring loaded shifting.

A still further object of this invention is to provide a trip member of the character described which is so designed that it does not cost more than present designs and eliminates the wear problems presently presented.

Other objects of this invention will be apparent hereinafter from the specification and from the recital in the appended claims.

Figure 2:
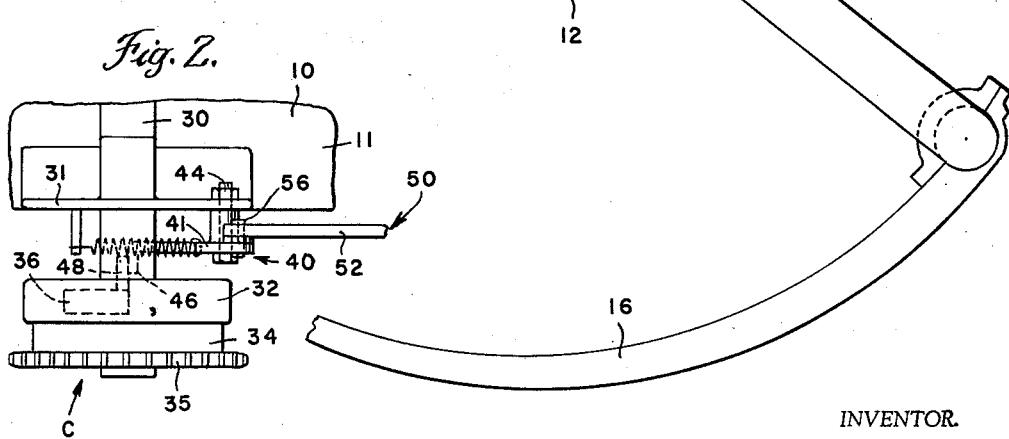

In the drawing:

FIG. 1 is a fragmentary side elevation of a trip arm constructed according to this invention and shown in solid lines at the beginning of an operating cycle and in dotted lines in clutch throwing position; and FIG. 2 is a fragmentary plan view of the connection of the trip arm to the clutch which the arm controls.

Referring now to the drawing by numerals of reference, 10 denotes the bale case of a hay baler having a top wall 11, a bottom wall 12 and side walls, one of which is shown at 14. Bales are formed within bale case 10 and they progressively move in the direction of the arrow 15 as they are made. After each bale is completed, it is banded with a twine or wire projectable across bale case 10 by needle means 16 carried on a yoke 18 pivotally connected at 19 to the bale case. The tier and other related structure of the baler is not shown, being conventional.

Mounted on top wall 11 of the bale case 10 is a shaft 20 rotatably supported on bracket means 21. Shaft 20 extends transversely of the bale case and carries a metering wheel 22 which projects downwardly into the bale case to engage the top of each bale and be rotated responsive to the bale movement. When viewed as shown in FIG. 1, metering wheel 22 rotates in a counterlockwise direction. The wheel has angularly spaced, radially extending teeth 24 which are projected into and then are withdrawn from the bales as they move through the bale case. Metering wheel 22 is affixed to shaft 20. Thus, shaft 20 is rotated by the wheel and this drives a friction wheel 25, also affixed to the shaft, in a counterclockwise direction. The rotation of friction wheel 25 is utilized to trigger the tying operation of the baler.

Mounted on top wall 11 of bale case 10 and in spaced relation to metering wheel 22 is a timer shaft 30 rotatably carried on upright support means 31. Shaft 30 extends parallel to shaft 20 and is adapted to be intermittently rotated through a conventional one-revolution clutch C. One clutch element 32 is fixed to shaft 30. A second clutch element 34 continually rotates on the shaft 30, being rotated by a drive sprocket 35 from a source of power not shown. Clutch element 34 normally rotates relative to element 32, being linked to element 32 only when a clutch pawl 36 is released. When pawl 36 is released, the clutch C rotates one revolution and operates through a link 38 to oscillate yoke 18 and cause the needles 16 to be projected up through bale case bottom wall 12, across the bale case 10, through top wall 11 and then return to starting position as shown in FIG. 1.

Pawl 36 is normally held in a clutch disengaging position as shown in FIG. 1 by a bell crank 40 having a first leg 41 and a second leg 42 pivotally connected at 44 to support means 31. Leg 41 engages pawl 36 and leg 42 has a spring 45 connected to it, to spring bias the bell crank to normal position. As shown best in FIG. 2, bell crank leg 41 has a laterally projecting portion 46 and the clutch pawl 36 has a laterally projecting portion 48, the portions 46 and 48 engaging each other to hold clutch C disengaged. However, when bell crank 40 is pivoted from the solid to the dotted position shown in FIG. 1, leg 41 is moved out of engagement with pawl 36 and clutch C is engaged.

To pivot bell crank 40, an L-shaped trip member 50 is provided having a vertically extending first arm 51 and an arm 52 extending in a horizontal direction. As shown in FIG. 1, arm 51 has an edge 54 which engages the periphery of friction wheel 25. One end 55 of arm 52 is pivotally connected at 56 to bell crank leg 42. The spring 45 acting against the bell crank also acts against trip member 50 to held it in spring biased relation to the friction wheel 25.

The edge 54 of arm 51 has an arcuate first portion 60 extending away from arm 52. Portion 60 is concentric to pivot point 56 drawn on a radius line indicated R. Edge 54 also has an outer cam portion 61 which is inclined relative to the arc of portion 60. Cam portion 61 extends inwardly toward pivot point 56 and inside of the arc of the portion 60. At the terminal free end of arm 51 an ear 62 is provided as shown to keep friction wheel 25 from rolling off of the arm.

In operation, when friction wheel 25 rotates in a counterclockwise direction from the position shown in FIG. 1, trip member 50 engaging the periphery of the wheel is caused to move vertically. As long as the wheel is engaging arcuate portion 60 of edge 54, member 50 lifts and pivots about point 56. But, the member does not shift longitudinally. However, when the cam portion 61 of edge 54 reaches the friction wheel, the trip member is caused to shift toward the right of FIG. 1 as indicated by the arrow 64. This shifting causes bell crank 40 to pivot in a clockwise direction and release pawl 36 and actuate clutch C. When the clutch rotates one revolution, means not shown is provided which engages the bell crank to reverse rotate it back to its starting position and to cause the trip arm to reset. When being reset, the arm moves back to the position shown in solid lines in FIG. 1 and in a direction indicated by the arrow 65. A stop 66 is provided on arm 51 and engageable with friction wheel 25 to return the parts to their starting positions. With the formation of each bale, the trip arm is lifted and then shifted to actuate bell crank 40. This is successively repeated at the completion of each bale to trigger each tying cycle.

With the trip member structure described, the wear problem resulting from engagement of metering wheel 25 with edge 54 is minimal. The actuation of clutch C is precise and positive. A higher degree of control is thus provided. Further, these advantages are obtained with an arrangement which is no more costly than structures presently employed.

While this invention has been described in connection with a particular embodiment thereof, it will be understood that it is capable of modification, and this application is intended to cover any variations, uses, or adaptations following, in general, the principles of the invention and including such departures from the present disclosure as come within known or customary practice in the art to which the invention pertains, and as fall within the scope of the invention or the limits of the appended claims.

Having thus described my invention, what I claim is:

1. In a hay baler, an elongated bale case in which bales move longitudinally as they are formed, a metering wheel projecting into said bale case for rotation on an axis transverse to the bale case responsive to bale movement, a shaft on said bale case in spaced parallel relation to said metering wheel axis, a drive sprocket rotatable on said shaft, a clutch for connecting said sprocket to the shaft, a bell crank pivotally mounted on said bale case, spring means yieldably holding said bell crank in a normal position, a clutch pawl, said bell crank having first and second legs, said first leg engaging said pawl and holding said clutch disengaged when the bell crank is in said normal position, and means for pivoting said bell crank to release said pawl and engage said clutch comprising in combination a friction wheel parallel to said metering wheel and rotated thereby, an L-shaped trip member having a first arm extending in a vertical direction on the side of said friction wheel remote from said shaft and a second arm extending in a horizontal direction over said friction wheel and to said bell crank, means pivotally connecting said second arm to said second bell crank leg, said first arm having an edge engaging the periphery of said friction wheel, said edge having an inner portion on an arc generally concentric to said pivotal connection between said second arm and said bell crank second leg and having an outer cam portion inclined from said arc and toward the pivotal connection, said trip member being pivoted responsive to rotation of said friction wheel and upon engagement of the friction wheel with said cam portion the member being shifted longitudinally whereby said bell crank is pivoted and said pawl is released.

2. In a hay baler as recited in claim 1 wherein said first arm of said trip member has an ear at the end of said cam portion remote from said second arm to limit movement of said friction wheel along said edge of said first arm.

3. In a hay baler, an elongated bale case in which bales move longitudinally as they are formed, a metering wheel projecting into said bale case for rotation on an axis transverse to the bale case responsive to bale movement, a friction wheel parallel to said metering wheel and rotated thereby, a trip member having a first arm extending in a vertical direction and a second arm extending in a horizontal direction, said first arm having an edge engaging the periphery of said friction wheel, means spring biasing said second arm longitudinally and holding said first arm edge in engagement with said friction wheel, a cam surface on said first arm edge along an end thereof spaced from said second arm, said arms being progressively moved vertically as said friction wheel rotates and said arms being shifted longitudinally upon engagement of said friction wheel with said cam surface, a clutch, and means connected between said second arm and said clutch to trip the clutch responsive to longitudinal shifting of said second arm.

4. In a hay baler, an L-shaped trip member comprising a first arm, a second arm connected to the first arm at one end thereof and having a pivot point at an end opposite said one end, said first arm having an inside edge extending transversely to said second arm, said edge having an inner portion adjacent said first arm and an outer portion more remote therefrom, said inner portion being on an arc concentric to said pivot point and said outer portion being inclined inwardly of said arc and toward the pivot point.

5. In a hay baler as recited in claim 4 wherein said inner portion has a length greater than said outer portion.

References Cited by the Examiner

UNITED STATES PATENTS

| 2,897,747 | 8/59 | May | 100—4 |
| 2,897,748 | 8/59 | Nolt et al. | 100—4 |
| 2,981,173 | 4/61 | Nolt | 100—19 |
| 3,119,323 | 1/64 | Grillot et al. | 100—4 |
| 3,129,654 | 4/64 | Locker et al. | 100—4 |

WALTER A. SCHEEL, *Primary Examiner.*